United States Patent
Kim

(10) Patent No.: US 11,267,286 B2
(45) Date of Patent: Mar. 8, 2022

(54) RUBBER COMPOSITION FOR TIRE TREAD AND TIRE MANUFACTURED BY USING SAME

(71) Applicant: HANKOOK TIRE & TECHNOLOGY CO., LTD., Seoul (KR)

(72) Inventor: Kihyun Kim, Daejeon (KR)

(73) Assignee: HANKOOK TIRE & TECHNOLOGY CO., LTD., Seoul (KR)

( * ) Notice: Subject to any disclaimer, the term of this patent is extended or adjusted under 35 U.S.C. 154(b) by 296 days.

(21) Appl. No.: 16/708,675

(22) Filed: Dec. 10, 2019

(65) Prior Publication Data

US 2020/0369085 A1    Nov. 26, 2020

(30) Foreign Application Priority Data

May 23, 2019    (KR) .................. 10-2019-0060499

(51) Int. Cl.
| | | |
|---|---|---|
| *B60C 1/00* | (2006.01) | |
| *C08K 3/04* | (2006.01) | |
| *C08K 3/36* | (2006.01) | |
| *C08C 19/36* | (2006.01) | |
| *C08C 19/22* | (2006.01) | |

(52) U.S. Cl.
CPC ............ *B60C 1/0016* (2013.01); *C08C 19/22* (2013.01); *C08C 19/36* (2013.01); *C08K 3/04* (2013.01); *C08K 3/36* (2013.01); *C08K 2201/006* (2013.01)

(58) Field of Classification Search
CPC .... B60C 1/00; C08K 3/04; C08K 3/36; C08C 19/36; C08C 19/22
USPC ........................................................ 523/155
See application file for complete search history.

(56) References Cited

U.S. PATENT DOCUMENTS

| 4,357,432 A | 11/1982 | Edwards |
| 2011/0224351 A1 | 9/2011 | Mori et al. |

FOREIGN PATENT DOCUMENTS

| CN | 102408524 A | | 4/2012 | |
| CN | 102492101 A | | 6/2012 | |
| CN | 103509159 A | | 1/2014 | |
| EP | 0514910 A1 | | 11/1992 | |
| EP | 1491584 A1 | | 12/2004 | |
| EP | 1902865 A1 | | 3/2008 | |
| JP | 2002-201310 A | | 7/2002 | |
| JP | 2014-201651 A | | 10/2014 | |
| JP | 6389240 B2 | | 8/2018 | |
| KR | 1020090030024 A | | 3/2009 | |
| KR | 1020110072403 A | | 6/2011 | |
| KR | 10-2013-0008584 A | | 1/2013 | |
| KR | 10-2013-0093600 A | | 8/2013 | |
| KR | 1020140055682 A | | 5/2014 | |
| KR | 10-2016-0124822 A | | 10/2016 | |
| WO | 2006-524725 A | * | 11/2006 | ............. C08C 19/20 |
| WO | 2007060677 A1 | | 5/2007 | |

OTHER PUBLICATIONS

Qi et al., Grafting Copolymerization of Maleic Anhydride onto Styrene-Butadiene-Styrene Block Copolymer through Solvothermal Process, Wiley InterScience, pp. 5275-5279 (Year: 2006).*
"Reduced filler flocculation in the silica-filled styrene-butadiene-glycidyl methacrylate terpolymer", Kihyun Kim et al, Composite Interfaces, 2015, vol. 22, No. 2, pp. 137-149.

* cited by examiner

*Primary Examiner* — Deve V Hall
(74) *Attorney, Agent, or Firm* — Invenstone Patent, LLC

(57) ABSTRACT

The present disclosure relates to a rubber composition for tire tread and a tire manufactured by using the same, and the rubber composition for tire tread improves rolling resistance and abrasion resistant performance and can improve handling and braking performances on a wet road surface and an ice and snow road surface at the same time by comprising 100 parts by weight of raw rubber and 70 to 120 parts by weight of a reinforcing filler, wherein the raw rubber includes 0 to 50 parts by weight of natural rubber, 20 to 100 parts by weight of a melt grafting-functionalized styrene butadiene rubber, and 0 to 30 parts by weight of butadiene rubber.

9 Claims, No Drawings

RUBBER COMPOSITION FOR TIRE TREAD AND TIRE MANUFACTURED BY USING SAME

CROSS-REFERENCE TO RELATED APPLICATION

This application claims priority to Korean Patent Application No. 10-2019-0060499, filed on May 23, 2019, the disclosure of which is incorporated herein by reference in its entirety.

BACKGROUND OF THE INVENTION

1. Field of the Invention

The present disclosure relates to a rubber composition for tire tread and a tire manufactured by using the same, and more specifically, to a rubber composition for tire tread, the rubber composition which improves rolling resistance and abrasion resistant performance and improves handling performance and braking performance on wet, and ice and snow road surfaces at the same time, and a tire manufactured by using the same.

2. Description of Related Art

Environmental issues due to global warming, fine dust, and others in addition to the problem of high oil prices due to oil exhaustion have been globally considered as big issues. Accordingly, much effort has been made in an automotive industry to improve such environmental issues. In order to improve fuel efficiency and reduce environmental pollutant discharge amount, automobile manufacturers have been developing and released hybrid vehicles and electric vehicles, and new electric vehicle manufacturers instead of existing automobile manufacturers have also been created. A tire industry is trying to increase fuel efficiency of vehicles by reducing energy losses due to rolling resistance of tires.

According to the labelling system that has been globally enforced started in Europe since 2012, grades for braking performance, fuel efficiency performance and noises on a wet road surface are provided to consumers in a state that the grades are marked, and a domestic market has also been enforcing an energy consumption efficiency grade system in line with such a global trend.

Therefore, since the tire industry has been focusing on developing labelled performance-oriented products, there is a trade-off tendency in which the other performance becomes unfavorable to improve one performance. Such performances include abrasion resistant performance which may have an effect on purchase cycle of consumers, snow performance affecting ice and snow braking performance and handling performance in the wintertime, and fatigue resistant performance determining long-term stability.

A tire industry in European market is divided into summer tires and winter tires, while North American and domestic primary sales markets are mainly a market for all season tires. Recently, a market environment that had been divided into two markets for the summer tires and winter tires has been gradually grown into a market environment that is the market for all season tires with the development of the North American market. Since the all-season tires are used in the wintertime as well as the summertime without replacing the tires, the all-season tires require braking performance on an ice and snow road surface as well as braking performance and abrasion resistance performance on a wet road surface.

However, since such braking performance on the ice and snow road surface as well as braking performance and abrasion resistance performance on the wet road surface are performances conflicting with each other, physical properties showing the braking performance on the wet road surface of the rubber composition are improved while the braking performance on the ice and snow road surface is deteriorated when increasing glass transition temperature of a rubber composition or increasing content of a reinforcing agent to improve the braking performance on the wet road surface.

General tires are used in a wide temperature range from −20° C. to 40° C. However, when conducting an operation of driving a vehicle for a long time on a high temperature asphalt of which temperature is increased up to 40° C. in the middle of summer, a tire use temperature range may allow synthetic oil, which is used for facilitating processing of rubber, to flow out to the outside from the inside of a tread, and may finally cause a change in elastic properties of rubber. Therefore, the tire use temperature range has been recognized as a risk factor in tire driving stability.

In order to overcome such a problem of an existing technique, it is necessary to develop a technology for a rubber composition for tire tread, the rubber composition which is capable of improving rolling resistance, abrasion resistant performance, and handling and braking performances on a wet road surface and an ice and snow road surface at the same time.

RELATED ART DOCUMENT

Patent Document (Patent document 1) Korean Patent Laid-Open Publication No. 10-2016-0124822 (Oct. 28, 2016)

SUMMARY OF THE INVENTION

An objective of the present disclosure is to provide a rubber composition for tire tread, the rubber composition which improves rolling resistance and abrasion resistant performance and improves handling and braking performances on a wet road surface and an ice and snow road surface at the same time.

The other objective of the present disclosure is to provide a tire manufactured by using the rubber composition for tire tread.

Technical Solution

A rubber composition for tire tread according to an aspect of the present disclosure is provided, the rubber composition for tire tread comprises 100 parts by weight of raw rubber and 70 to 120 parts by weight of a reinforcing filler, wherein the raw rubber includes 0 to 50 parts by weight of natural rubber, 20 to 100 parts by weight of a melt grafting-functionalized styrene butadiene rubber, and 0 to 30 parts by weight of butadiene rubber.

In the rubber composition for tire tread, the melt grafting-functionalized styrene butadiene rubber may introduce a peroxide and an acrylate-based or methacrylate-based functional group using an emulsion-polymerized or solution-polymerized styrene butadiene rubber.

In the rubber composition for tire tread, the melt grafting-functionalized styrene butadiene rubber may include 20 to 50 wt % of styrene, and have 10 to 40 wt % of vinyl contained in butadiene.

In the rubber composition for tire tread, the melt grafting-functionalized styrene butadiene rubber may have a glass transition temperature of −50 to −10° C., and may include 10 to 40 parts by weight of oil with respect to 100 parts by weight of the melt grafting-functionalized styrene butadiene rubber.

In the rubber composition for tire tread, the acrylate-based functional group may be selected from the group consisting of 2-carboxyethyl acrylate, methyl acrylate, ethyl acrylate, ethylene glycol methyl ether acrylate, vinyl acrylate, 2-hydroxyethyl acrylate, isooctyl acrylate, octyl acrylate, and combinations thereof, and the methacrylate-based functional group may be selected from the group consisting of methyl methacrylate, 2-(diethylamino)ethyl methacrylate, polymethylmethacrylate, poly(ethylene glycol)methacrylate, hydroxypropyl methacrylate, ethylene glycol methyl ether methacrylate, 2-(dimethylamino)ethyl methacrylate, 2-(diethylamino)ethyl methacrylate, glycidyl methacrylate, and combinations thereof.

In the rubber composition for tire tread, the butadiene rubber may include 90 wt % or more of cis-1,4-butadiene and may have a glass transition temperature of −100 to −120° C.

In the rubber composition for tire tread, the reinforcing filler may include 5 to 20 parts by weight of carbon black and 65 to 100 parts by weight of silica.

In the rubber composition for tire tread, the silica may be high dispersibility silica having a nitrogen adsorption specific surface area of 160 to 180 $m^2/g$ and a CTAB adsorption specific surface rea of 150 to 170 $m^2/g$.

Furthermore, a tire according to the other aspect of the present disclosure manufactured by using the rubber composition for tire tread is provided.

A rubber composition for tire tread according to the present disclosure may provide a tire which improves rolling resistance and abrasion resistant performance and has improved handling and braking performances on a wet road surface and an ice and snow road surface at the same time.

DETAILED DESCRIPTION OF THE INVENTION

Hereinafter, the present disclosure will be described in more detail.

However, these embodiments are only exemplary, and the present disclosure is not limited thereto.

In the following description, when the detailed description of the relevant known configuration or function is determined to unnecessarily obscure the important point of the present disclosure, the detailed description will be omitted.

Terms such as first, second, A, B, (a), and (b) may be used to describe the present disclosure. Such terms are used for merely discriminating the corresponding elements from other elements and the corresponding elements are not limited in their essence, sequence, or precedence by the terms.

In the detailed description of the preferred embodiments of the present disclosure, when unique manufacture and material allowable errors of numerical values are suggested to mentioned meanings of terms of degrees such as "about", "substantially", "degree", etc., the terms of degrees are used as the numerical values or as a meaning near the numerical values, and the terms of degrees are used to prevent that an unscrupulous infringer unfairly uses a disclosure content in which extract or absolute numerical values are mentioned to help understanding of the present disclosure.

A rubber composition for tire tread according to an embodiment of the present disclosure may comprise raw rubber and a reinforcing filler. Particularly, a rubber composition for tire tread according to an embodiment of the present disclosure can improve rolling resistance properties and abrasion resistant performance without deteriorating various physical properties by comprising a melt grafting-functionalized styrene butadiene rubber to introduce a polar functional group into chains of styrene butadiene rubber, thereby increasing affinity between styrene butadiene rubber and silica to prevent a reaggregation phenomenon of silica and improving dispersibility of silica to induce energy loss reduction due to friction between fillers.

Hereinafter, respective components of the rubber composition for tire tread will be described in detail.

(1) Raw Rubber

In the rubber composition for tire tread, the raw rubber may include a melt grafting-functionalized styrene butadiene rubber.

The melt grafting-functionalized styrene butadiene rubber is a functionalized rubber obtained by melt-grafting styrene butadiene rubber using a peroxide as a grafting agent and an acrylate-based or methacrylate-based functional group.

The melt grafting-functionalized styrene butadiene rubber may be manufactured by a method comprising injecting styrene butadiene rubber into a rubber mixer, kneading the styrene butadiene rubber injected into the rubber mixer, injecting a peroxide capable of supplying radicals and an acrylate-based or methacrylate-based functional group obtained by purifying a polymerization inhibitor into the rubber mixer, kneading a mixture of the peroxide and the functional group, and melt-grafting the styrene butadiene rubber with the mixture of the peroxide and the functional group.

Recently, solution-polymerized styrene butadiene rubbers for improving dispersibility of silica within a compound have frequently been used to develop a low fuel consumption tire. Particularly, a functionalized solution-polymerized styrene butadiene rubber having a polar group given to an end thereof among the solution-polymerized styrene butadiene rubbers has been actively used. Such a functionalized solution-polymerized styrene butadiene rubber can reduce hysteresis generated from a polymer chain end by an effect of increasing affinity with silica by giving a polar functional group to only one end or both ends of the functionalized solution-polymerized styrene butadiene rubber. However, since the functional group can be given to the end(s) only due to technical limitations, there is a limitation in maximizing dispersion of a silica filler.

A melt grafting-functionalized styrene butadiene rubber according to the present disclosure is a rubber in which a polar functional group is given to the middle of a styrene butadiene polymer chain by using a melt grafting method. The melt grafting method has an advantage capable of giving a functional group with various contents according to an injection amount of a polar functional group having affinity with silica when manufacturing styrene butadiene rubber through melt grafting.

When a polar functional group is introduced into a styrene butadiene polymer chain through the melt grafting method, affinity between rubber and silica can be increased by solving a dispersibility deterioration problem due to a polarity difference between hydrophilic silica and lipophilic rubber through introduction of the functional group. An affinity-improved silica rubber composition can improve dispersibility of silica by preventing a silica reaggregation phenomenon which is generated during storage of a rubber composition or in the early stage of vulcanization due to an increase in binding power between rubber and silica. When dispersibility of silica is improved, rolling resistance properties and tire abrasion resistant performance can be improved without deteriorating various physical properties of a tire composition by inducing energy loss reduction due to friction between fillers.

The styrene butadiene rubber may be an emulsion-polymerized styrene butadiene rubber (hereinafter, referred to as "E-SBR") or a solution-polymerized styrene butadiene rubber (hereinafter, referred to as "S-SBR").

The acrylate-based functional group may be selected from the group consisting of 2-carboxyethyl acrylate, methyl acrylate, ethyl acrylate, ethylene glycol methyl ether acrylate, vinyl acrylate, 2-hydroxyethyl acrylate, isooctyl acrylate, octyl acrylate, and combinations thereof.

The methacrylate-based functional group may be selected from the group consisting of methyl methacrylate, 2-(diethylamino)ethyl methacrylate, polymethylmethacrylate, poly(ethylene glycol)methacrylate, hydroxypropyl methacrylate, ethylene glycol methyl ether methacrylate, 2-(dimethylamino)ethyl methacrylate, 2-(diethylamino)ethyl methacrylate, glycidyl methacrylate, and combinations thereof.

The melt grafting-functionalized styrene butadiene rubber may include 0.5 to 5.0 parts by weight of the acrylate-based or methacrylate-based functional group with respect to 100 parts by weight of the melt grafting-functionalized styrene butadiene rubber. There may not be a big difference in physical properties when the melt grafting-functionalized styrene butadiene rubber includes less than 0.5 part by weight of the functional group while there may be a problem in compound processability when the melt grafting-functionalized styrene butadiene rubber includes more than 5.0 parts by weight of the functional group.

The melt grafting-functionalized styrene butadiene rubber may include 20 to 50 wt % of styrene, and have 10 to 40 wt % of vinyl contained in butadiene. The melt grafting-functionalized styrene butadiene rubber is desirable in that that improvement of braking performance with respect to a wet road surface or an ice and snow road surface can be expected when the melt grafting-functionalized styrene butadiene rubber includes the above-mentioned ranges of styrene and butadiene.

The melt grafting-functionalized styrene butadiene rubber may have a glass transition temperature of −50 to −10° C. The melt grafting-functionalized styrene butadiene rubber is desirable in that that improvement of the braking performance with respect to the ice and snow road surface can be expected when the melt grafting-functionalized styrene butadiene rubber has the above-mentioned glass transition temperature range.

Further, the melt grafting-functionalized styrene butadiene rubber may include 10 to 40 parts by weight of oil with respect to 100 parts by weight of a raw rubber elastomer. The melt grafting-functionalized styrene butadiene rubber is desirable in that that flexibility of the melt grafting-functionalized styrene butadiene rubber deteriorated by influence of styrene can be expected to be increased when melt grafting-functionalized styrene butadiene rubber includes the above-mentioned range of oil.

Other rubber which can be mixed with the melt grafting-functionalized styrene butadiene rubber may include, without limitations, rubbers used in a tire rubber field.

The other rubber, for example, may be any one selected from the group consisting of natural rubber, synthetic rubber, and a combination thereof.

The natural rubber may be a general natural rubber or a modified natural rubber.

The general natural rubber may include any rubbers which have been known as natural rubber without limiting place of origin or the like thereof. The natural rubber includes cis-1,4-polyisoprene as a main body, but may include trans-1,4-polyisoprene according to required characteristics. Therefore, the natural rubber may also include natural rubber including trans-1,4-isoprene as a main body, e.g., balata or the like, i.e., a type of South American Sapotaceae rubber besides the natural rubber including cis-1,4-polyisoprene as a main body.

The modified natural rubber means a natural rubber obtained by modifying or purifying the general natural rubber. For example, the modified natural rubber may include an epoxidized natural rubber (ENR), a deproteinized natural rubber (DPNR), a hydrogenated natural runner, etc.

The raw rubber may include 0 to 50 parts by weight of the natural rubber. The raw rubber may provide a rubber composition for tire tread exhibiting physical properties such as appropriate rebound resilience, heat generation and so on in such an amount range.

The synthetic rubber may be any one selected from the group consisting of styrene butadiene rubber (SBR), modified styrene butadiene rubber, butadiene rubber (BR), modified butadiene rubber, chlorosulfonated polyethylene rubber, epichlorohydrin rubber, fluorine rubber, silicone rubber, nitrile rubber, hydrogenated nitrile rubber, nitrile butadiene rubber (NBR), modified nitrile butadiene rubber, chlorinated polyethylene rubber, styrene ethylene butylene styrene (SEBS) rubber, ethylene propylene rubber, ethylene propylene diene monomer (EPDM) rubber, Hypalon rubber, chloroprene rubber, ethylene vinyl acetate rubber, acrylic rubber, hydrin rubber, vinyl benzyl chloride styrene butadiene rubber, bromomethyl styrene butyl rubber, maleated styrene butadiene rubber, carboxylated styrene butadiene rubber, epoxy isoprene rubber, maleated ethylene propylene rubber, carboxylated nitrile butadiene rubber, brominated polyisobutyl isoprene-co-paramethyl styrene (BIMS), and combinations thereof.

In one example, the rubber mixed with the melt grafting-functionalized styrene butadiene rubber may include butadiene rubber.

For example, the butadiene rubber may be high cis-butadiene rubber having a cis-1,4-butadiene content of 90 wt % or more and a glass transition temperature (Tg) of −100 to −120° C. Further, the butadiene rubber may be butadiene rubber having a Mooney viscosity of 43 to 47 at 100° C. When the high cis-butadiene rubber is used, the high cis-butadiene rubber has an advantageous effect in terms of abrasion resistant performance and heat build-up under dynamic stress. Namely, the butadiene rubber has a high molecular chain linearity, a high cis-1,4 butadiene content, and narrow molecular weight distribution. When using such butadiene rubber, the butadiene rubber has excellent heat generating properties and rebound resilience.

For example, the butadiene rubber may be included in the raw rubber in an amount range of 0 to 30 parts by weight with respect to the total weight of the raw rubber. A rubber composition for tire tread exhibiting appropriate mechanical rigidity and abrasion resistance in such an amount range can be provided.

(2) Reinforcing Filler

The rubber composition for tire tread may include a reinforcing filler. The filler may be any one selected from the group consisting of carbon black, silica, calcium carbonate, clay (hydrated aluminum silicate), aluminum hydroxide, lignin, silicate, talc, and combinations thereof. The reinforcing filler may be included in an amount range of 70 to 120 parts by weight with respect to 100 parts by weight of the raw rubber. A problem of deteriorating reinforcing properties of the rubber composition may be generated when the reinforcing filler is included in an amount range of less than 70 parts by weight, while a problem of deteriorating mixing processability of the rubber composition may be generated when the reinforcing filler is included in an amount range of more than 120 parts by weight.

(2-1) Carbon Black

Although the carbon black may have a nitrogen adsorption specific surface area (nitrogen surface area per gram, $N_2SA$) of 30 to 300 $m^2/g$ and a n-dibutyl phthalate (DBP) oil adsorption amount of 60 to 180 cc/100 g, the present disclosure is not limited thereto.

Processability of the rubber composition for tire tread may become disadvantageous when the carbon black has a nitrogen adsorption specific surface area of more than 300 $m^2/g$, while reinforcing performance of the rubber composition for tire tread may become disadvantageous due to carbon black, i.e., a filler when the carbon black has a nitrogen adsorption specific surface area of less than 30 $m^2/g$. Further, processability of the rubber composition may be deteriorated when the carbon black has a DBP oil adsorption amount of more than 180 cc/100 g, while reinforcing performance of the rubber composition may become disadvantageous due to carbon black, i.e., the filler when the carbon black has a DBP oil adsorption amount of less than 60 cc/100 g.

Typical examples of the carbon black may include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990, N991, etc.

The carbon black may be included in an amount of 5 to 20 parts by weight with respect to 100 parts by weight of the raw rubber. Reinforcing performance of the rubber composition may be deteriorated by the carbon black, i.e., a filler when the carbon black is included in an amount of less than 5 parts by weight, while processability of the rubber composition may become disadvantageous when the carbon black is included in an amount of more than 20 parts by weight.

(2-2) Silica

Although the silica may have a nitrogen adsorption specific surface area (nitrogen surface area per gram, $N_2SA$) of 160 to 180 $m^2/g$ and a CTAB (cetyltrimethylammonium bromide) adsorption specific surface area of 150 to 170 $m^2/g$, the present disclosure is not limited thereto.

Reinforcing performance of the rubber composition may become disadvantageous due to silica, i.e., a filler when the silica has a nitrogen adsorption specific surface area of less than 160 $m^2/g$, while processability of the rubber composition may become disadvantageous when the silica has a nitrogen adsorption specific surface area of more than 180 $m^2/g$. Further, reinforcing performance of the rubber composition may become disadvantageous due to silica, i.e., the filler when the silica has CTAB adsorption specific surface area of less than 150 $m^2/g$, while processability of the rubber composition may become disadvantageous when the silica has a CTAB adsorption specific surface area of more than 170 $m^2/g$.

The silica may include both silica manufactured by a wet method and silica manufactured by a dry method, and may include ULTRASIL VN2 (manufactured by Degussa Ag), ULTRASIL VN3 (manufactured by Degussa Ag), Z1165MP (manufactured by Rhodia), Z165GR (manufactured by Rhodia), etc. which are commercially available.

The silica may be included in an amount of 65 to 100 parts by weight with respect to 100 parts by weight of the raw rubber. Strength improvement of the rubber lacks, and braking performance of a tire may be deteriorated when the silica is included in an amount of less than 65 parts by weight, while abrasion resistant performance of the tire may be deteriorated when the silica is included in an amount of more than 100 parts by weight.

(3) Coupling Agent

The rubber composition for tire tread may further comprise a coupling agent to improve dispersibility of silica used as the reinforcing filler.

The coupling agent may include any one selected from the group consisting of a sulfide-based silane compound, a mercapto-based silane compound, a vinyl-based silane compound, an amino-based silane compound, a glycidoxy-based silane compound, a nitro-based silane compound, a chloro-based silane compound, a methacrylic silane compound and combinations thereof, and may preferably include the sulfide-based silane compound.

The sulfide-based silane compound may be any one selected from the group consisting of bis(2-trimethoxysilylethyl)tetrasulfide, bis(3-trimethoxysilylpropyl)tetrasulfide, bis(4-trimethoxysilylbutyl)tetrasulfide, bis(2-triethoxysilylethyl)tetrasulfide, bis(3-triethoxysilylpropyl)tetrasulfide, bis(4-triethoxysilylbutyl)tetrasulfide, bis(2-trimethoxysilylethyl)trisulfide, bis(3-trimethoxysilylpropyl)trisulfide, bis(4-trimethoxysilylbutyl)trisulfide, bis(2-triethoxysilylethyl)trisulfide, bis(3-triethoxysilylpropyl)trisulfide, bis(4-triethoxysilylbutyl)trisulfide, bis(2-trimethoxysilylethyl)disulfide, bis(3-trimethoxysilylpropyl)disulfide, bis(4-trimethoxysilylbutyl)disulfide, bis(2-triethoxysilylethyl)disulfide, bis(3-triethoxysilylpropyl)disulfide, bis(4-triethoxysilylbutyl)disulfide, 3-trimethoxysilylpropyl-N,N-dimethylthiocarbamoyltetrasulfide, 3-triethoxysilylpropyl-N,N-dimethylthiocarbamoyltetrasulfide, 2-trimethoxysilylethyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzothiazoltetrasulfide, 3-trimethoxysilylpropylmethacrylatemono sulfide, 3-triethoxysilylpropylmethacrylatemonosulfide, and combinations thereof.

The mercapto-based silane compound may be any one selected from the group consisting of 3-mercaptopropyltrimethoxysilane, 3-mercaptopropyltriethoxysilane, 2-mercaptoethyltrimethoxysilane, 2-mercaptoethyltriethoxysilane, and combinations thereof.

The vinyl-based silane compound may be any one selected from the group consisting of ethoxysilane, vinyltrimethoxysilane, and a combination thereof.

The amino-based silane compound may be any one selected from the group consisting of 3-aminopropyltrimethoxysilane, 3-aminopropyltriethoxysilane, 3-(2-aminoethyl)aminopropyltrimethoxysilane, 3-(2-aminoethyl)aminopropyltriethoxysilane, and combinations thereof.

The glycidoxy-based silane compound may be any one selected from the group consisting of γ-glycidoxypropyltrimethoxysilane, γ-glycidoxypropyltriethoxysilane, γ-glycidoxypropylmethyldimethoxysilane, γ-glycidoxypropylmethyldiethoxysilane, and combinations thereof.

The nitro-based silane compound may be any one selected from the group consisting of 3-nitropropyltrimethoxysilane, 3-nitropropyltriethoxysilane, and a combination thereof.

The chloro-based silane compound may be any one selected from the group consisting of 3-chloropropyltrimethoxysilane, 3-chloropropyltriethoxysilane, 2-chloroethyltrimethoxysilane, 2-chloroethyltriethoxysilane, and combinations thereof.

The methacrylic silane compound may be any one selected from the group consisting of γ-methacryloxypropyl trimethoxysilane, γ-methacryloxypropyl methyldimethoxysilane, γ-methacryloxypropyl dimethylmethoxysilane, and combinations thereof.

The coupling agent may be included in an amount of 1 to 20 parts by weight with respect to 100 parts by weight of the raw rubber to improve dispersibility of the silica. Processability of rubber may be deteriorated, or low fuel consumption performance may be deteriorated since silica is short fall of improvement in dispersibility when the coupling agent is included in an amount of less than 1 part by weight, while braking performance may be much deteriorated although low fuel consumption performance may be excellent since interaction between silica and rubber is too strong when the coupling agent is included in an amount of more than 20 parts by weight.

(4) Other Additives

The rubber composition for tire tread may further comprise optionally additional various additives including a vulcanizing agent, a vulcanization accelerator, a vulcanization acceleration aid, an antiaging agent, a softener, an adhesive, etc. The various additives may include any additives which are generally used in the art to which the present disclosure pertains, and amounts of the additives are in accordance with a mixing ratio used in a general rubber composition for tire tread. Therefore, the amounts of the additives are not particularly limited.

The vulcanizing agent may include a sulfur-based vulcanizing agent, an organic peroxide, a resin vulcanizing agent, and metal oxides such as magnesium oxide, etc.

The sulfur-based vulcanizing agent may include an inorganic vulcanizing agent such as sulfur (S) powder, insoluble sulfur (S), precipitated sulfur (S), colloidal sulfur, etc., and an organic vulcanizing agent such as tetramethylthiuram disulfide (TMTD), tetraethylthiuram disulfide (TETD), dithiodimorpholine, etc. Specifically, the sulfur-based vulcanizing agent may include a vulcanizing agent for producing element sulfur or sulfur, e.g., amine disulfide, polymer sulfur, etc.

The organic peroxide may be any one selected from the group consisting of benzoyl peroxide, dicumyl peroxide, di-tert-butyl peroxide, tert-butylcumylperoxide, methyl ethyl ketone peroxide, cumene hydroperoxide, 2,5-dimethyl-2,5-di(tert-butylperoxy)hexane, 2,5-dimethyl-2,5-di(benzoylperoxy)hexane, 2,5-dimethyl-2,5-di(tert-butylperoxy)hexyne-3, 1,3-bis(tert-butylperoxyisopropyl)benzene, di-tert-butylperoxy diisopropylbenzene, tert-butylperoxybenzene, 2,4-dichlorobenzoyl peroxide, 1,1-dibutylperoxy-3,3,5-trimethylsiloxane, n-butyl-4,4-di-(tert-butylperoxy)valerate, and combinations thereof.

It is desirable to include 0.5 to 4.0 parts by weight of the vulcanizing agent with respect to 100 parts by weight of the raw rubber in that the vulcanizing agent allows the raw rubber to be less sensitive to heat and chemically stable by exhibiting an appropriate vulcanization effect.

The vulcanization accelerator means an accelerator which accelerates vulcanization rate or accelerates delayed action in an initial vulcanization step.

The vulcanization accelerator may include any one selected from the group consisting of a sulfenamide-based vulcanization accelerator, a thiazole-based vulcanization accelerator, a thiuram-based vulcanization accelerator, a thiourea-based vulcanization accelerator, a guanidine-based vulcanization accelerator, a dithiocarbamic acid-based vulcanization accelerator, an aldehyde-amine based vulcanization accelerator, an aldehyde-ammonia based vulcanization accelerator, an imidazoline-based vulcanization accelerator, a xanthate-based vulcanization accelerator, and combinations thereof.

For example, the sulfenamide-based vulcanization accelerator may include any one sulfenamide-based compound selected from the group consisting of N-cyclohexyl-2-benzothiazylsulfenamide (CBS), N-tert-butyl-2-benzothiazylsulfenamide (TBBS), N,N-dicyclohexyl-2-benzothiazylsulfenamide, N-oxydiethylene-2-benzothiazylsulfenamide, N,N-diisopropyl-2-benzothiazolesulfenamide, and combinations thereof.

For example, the thiazole-based vulcanization accelerator may include any one thiazole-based compound selected from the group consisting of 2-mercaptobenzothiazole (MBT), dibenzothiazyl disulfide (MBTS), a sodium salt of 2-mercaptobenzothiazole, a zinc salt of 2-mercaptobenzothiazole, a copper salt of 2-mercaptobenzothiazole, a cyclohexylamine salt of 2-mercaptobenzothiazole, 2-(2,4-dinitrophenyl)mercaptobenzothiazole, 2-(2,6-diethyl-4-morpholinothio)benzothiazole, and combinations thereof.

For example, the thiuram-based vulcanization accelerator may include any one thiuram-based compound selected from the group consisting of tetramethylthiuram disulfide (TMTD), tetraethylthiuram disulfide, tetramethylthiuram monosulfide, dipentamethylenethiuram disulfide, dipentamethylenethiuram monosulfide, dipentamethylenethiuram tetrasulfide, dipentamethylenethiuram hexasulfide, tetrabutylthiuram disulfide, pentamethylenethiuram tetrasulfide, and combinations thereof.

For example, the thiourea-based vulcanization accelerator may include any one thiourea-based compound selected from the group consisting of thiocarbamide, diethylthiourea, dibutylthiourea, trimethylthiourea, Di-o-tolylthiourea, and combinations thereof.

For example, the guanidine-based vulcanization accelerator may include any one guanidine-based compound selected from the group consisting of diphenylguanidine, Di-o-tolylguanidine, triphenylguanidine, o-Tolylbiguanide, diphenylguanidine phthalate, and combinations thereof.

For example, the dithiocarbamic acid-based vulcanization accelerator may include any one dithiocarbamic acid-based compound selected from the group consisting of zinc ethylphenyldithiocarbamate, zinc butylphenyldithiocarbamate, zinc dimethyldithiocarbamate, zinc diethyldithiocarbamate, zinc dibutyldithiocarbamate, zinc diamyldithiocarbamate, zinc dipropyldithiocarbamate, zinc dibenzyldithiocarbamate, zinc hexadecylisopropyldithiocarbamate, zinc octadecylisopropyldithiocarbamate, a complex salt of zinc pentamethylenedithiocarbamate and piperidine, sodium dimethyldithiocarbamate, sodium diethyldithiocarbamate, piperidine pentamethylenedithiocarbamate, selenium dimethyldithiocarbamate, tellurium diethyldithiocarbamate, cadmium diamyldithiocarbamate, and combinations thereof.

For example, the aldehyde-amine based or aldehyde-ammonia based vulcanization accelerator may include an aldehyde-amine based or aldehyde-ammonia based compound selected from the group consisting of an acetaldehyde-aniline reactant, a butylaldehyde-aniline condensate, hexamethylenetetramine, an acetaldehyde-ammonia reactant, and combinations thereof.

For example, the imidazoline-based vulcanization accelerator may include imidazoline-based compounds such as 2-mercaptoimidazoline, etc., and the xanthate-based vulcanization accelerator may include, for example, xanthate-based compounds such as zinc dibutylxanthate, etc.

The vulcanization accelerator may be included in an amount of 0.5 to 4.0 parts by weight with respect to 100 parts by weight of the raw rubber to maximize improvements in productivity and rubber physical properties through acceleration of vulcanization rate.

The vulcanization acceleration aid, as a compounding agent which is used in a combination with the vulcanization accelerator to complete its acceleration effect, may include any one selected from the group consisting of an inorganic vulcanization acceleration aid, an organic vulcanization acceleration aid, and a combination thereof.

The inorganic vulcanization acceleration aid may include any one selected from the group consisting of zinc oxide (ZnO), zinc carbonate, magnesium oxide (MgO), lead oxide, potassium hydroxide, and combinations thereof. The organic vulcanization acceleration aid may include any one selected from the group consisting of stearic acid, zinc stearate, palmitic acid, linoleic acid, oleic acid, lauric acid, dibutyl ammonium oleate, derivatives thereof, and combinations thereof.

Particularly, the zinc oxide and the stearic acid may be used together as the vulcanization acceleration aid. In this case, a crosslinking reaction of rubber is facilitated by dissolving the lead oxide in the stearic acid, thereby producing favorable sulfur during a vulcanization reaction process by forming an effective complex with the vulcanization accelerator.

The zinc oxide and the stearic acid may respectively be used in amounts of 1 to 5 parts by weight and 0.5 to 3 parts by weight with respect to 100 parts by weight of the raw rubber in order to perform an appropriate role as the vulcanization acceleration aid when the zinc oxide and the stearic acid are used together. Productivity may be deteriorated since vulcanization rate is slow when the zinc oxide and the stearic acid are used in amounts less than the ranges, while physical properties may be lowered since a scorch phenomenon occurs when the zinc oxide and the stearic acid are used in amounts more than the ranges.

The softener, which is added to the rubber composition to facilitate processing or lower hardness of vulcanized rubber by giving plasticity to rubber, means other oil materials used during rubber mixing or rubber manufacturing. The softener means oils included in process oil or other rubber compositions. Although the softener may include any one selected from the group consisting of a petroleum-based oil, a vegetable oil, and a combination thereof, the present disclosure is not limited thereto.

The petroleum-based oil may include any one selected from the group consisting of a paraffin-based oil, a naphthene-based oil, an aromatic oil, and combinations thereof.

Typical examples of the paraffin-based oil may include P-1, P-2, P-3, P-4, P-5, P-6, etc. of Michang Oil Industry Co., Ltd. Typical examples of the naphthene-based oil may include N-1, N-2, N-3, etc. of Michang Oil Industry Co., Ltd. Typical examples of the aromatic oil may include A-2, A-3, etc. of Michang Oil Industry Co., Ltd.

However, since a cancer-causing possibility has been known to be high when polycyclic aromatic hydrocarbons (hereinafter, referred to as TAHs') included in the aromatic oil have a content of more than 3 wt % along with a recent upsurge of environmental consciousness, the aromatic oil may preferably include a treated distillate aromatic extract (TDAE) oil, a mild extraction solvate (MES) oil, a residual aromatic extract (RAE) oil, or a heavy naphthenic oil.

Particularly, oil used as the softener may preferably include TDAE oil in which a PAHs component is included in a total amount of 3 wt % or less with respect to the total weight of the oil, which has a kinematic viscosity of 95 or more (210° F. SUS), and which comprises 15 to 25 wt % of an aromatic component, 27 to 37 wt % of a naphthenic component, and 38 to 58 wt % of a paraffinic component.

The TDAE oil has characteristics advantageous even to environmental factors such as a cancer-causing possibility of PAHs while enabling a tire tread including the TDAE oil to maintain excellent low temperature characteristics and fuel efficiency performance.

The vegetable oil may include any one selected from the group consisting of castor oil, cottonseed oil, linseed oil, canola oil, soybean oil, palm oil, coconut oil, peanut oil, pine oil, pine tar, tall oil, corn oil, rice bran oil, safflower oil, sesame oil, olive oil, sunflower oil, palm kernel oil, camellia oil, jojoba oil, Macadamia Nut Oil, Carthamus Tinctorius (Safflower) Seed Oil, Chinese wood oil, and combinations thereof.

The softener is preferably included in an amount of 0 to 150 parts by weight with respect to 100 parts by weight of the raw rubber in that the softener improves processability of the raw rubber.

The antiaging agent is an additive which is used to stop a chain reaction in which a tire is automatically oxidized by oxygen. The antiaging agent may include any one appropriately selected from the group consisting of an amine-based antiaging agent, a phenolic antiaging agent, a quinoline-based antiaging agent, an imidazole-based antiaging agent, carbamate metal salt, wax, and combinations thereof.

The amine-based antiaging agent may include any one selected from the group consisting of N-phenyl-N'-(1,3-dimethyl)-p-phenylenediamine, N-(1,3-dimethylbutyl)-N'-phenyl-p-phenylenediamine, N-phenyl-N'-isopropyl-p-phenylenediamine, N,N'-diphenyl-p-phenylenediamine, N,N'-diaryl-p-phenylenediamine, N-phenyl-N'-cyclohexyl-p-phenylenediamine, N-phenyl-N'-octyl-p-phenylenediamine, and combinations thereof.

The phenolic antiaging agent may include any one selected from the group consisting of 2,2'-methylene-bis(4-methyl-6-tert-butylphenol), 2,2'-isobutylidene-bis(4,6-dimethylphenol), 2,6-di-tert-butyl-p-cresol, and combinations thereof.

The quinoline-based antiaging agent may include 2,2,4-trimethyl-1,2-dihydroquinoline and derivatives thereof, specifically any one selected from the group consisting of 6-ethoxy-2,2,4-trimethyl-1,2-dihydroquinoline, 6-anilino-2,2,4-trimethyl-1,2-dihydroquinoline, 6-dodecyl-2,2,4-trimethyl-1,2-dihydroquinoline, and combinations thereof.

The wax preferably includes waxy hydrocarbons.

The antiaging agent may be included in an amount of 1 to 10 parts by weight with respect to 100 parts by weight of the raw rubber considering conditions that the antiaging agent should have a high solubility for rubber besides an antiaging effect, should have a low volatility, should be inactive to rubber, and should not hinder vulcanization.

The adhesive contributes to improvement in physical properties of rubber by further improving tack performance between rubbers and improving mixability, dispersibility and processability of other additives including a filler.

The adhesive may include a natural resin-based adhesive such as a rosin-based resin or a terpene-based resin, and a synthetic resin-based adhesive such as petroleum resin, coal tar, alkyl phenolic resin, or the like.

The rosin-based resin may be any one selected from the group consisting of a rosin resin, a rosin ester resin, a hydrogen-added rosin ester resin, derivatives thereof, and combinations thereof.

The terpene-based resin may be any one selected from the group consisting of a terpene resin, a terpene phenol resin, and a combination thereof.

The petroleum resin may be any one selected from the group consisting of an aliphatic resin, an acid-modified aliphatic resin, an alicyclic resin, a hydrogen-added alicyclic resin, an aromatic ($C_9$) resin, a hydrogen-added aromatic resin, a $C_5$-$C_9$ copolymer resin, a styrene resin, a styrene copolymer resin, and combinations thereof.

The coal tar may be coumarone-indene resin.

The alkyl phenolic resin may be p-tert-alkylphenol formaldehyde resin or resorcinol formaldehyde resin, and the p-tert-alkylphenol formaldehyde resin may be any one selected from the group consisting of p-tert-butylphenol formaldehyde resin, p-tert-octyl phenol formaldehyde resin, and a combination thereof.

The adhesive may be included in an amount of 2 to 4 parts by weight with respect to 100 parts by weight of the raw rubber. Adhesion performance of the rubber may become disadvantageous when the adhesive is included in an amount of less than 2 parts by weight with respect to 100 parts by weight of the raw rubber, while physical properties of the rubber may be deteriorated when the adhesive is included in an amount of more than 4 parts by weight with respect to 100 parts by weight of the raw rubber.

The rubber composition for tire tread may be prepared through a general continuous preparation process of two steps. Namely, although the rubber composition for tire tread may be prepared in an appropriate mixer by using a first step of performing a thermomechanical treatment or kneading process at a maximum temperature ranging from 110 to 190° C., preferably at a high temperature of 130 to 180° C. and a second step of performing a mechanical treatment process typically at less than 110° C., e.g., at a low temperature of 40 to 100° C. while performing a finishing step of allowing a crosslinking system to be mixed, the present disclosure is not limited thereto.

The rubber composition for tire tread may be included in various rubber components composing a tire without being limited to tread (tread cap or tread base). The rubber components may include sidewalls, a sidewall insertion, an apex, a chafer, a wire coat, an inner liner, etc.

A tire according to another embodiment of the present disclosure is manufactured using the rubber composition for tire tread. Since any of the methods which have conventionally been used in manufacturing of the tire may be applicable if a method of manufacturing a tire using the rubber composition for tire tread includes methods which have conventionally been used in manufacturing of the tire, detailed description will be omitted in the present specification.

The tire may be a tire for passenger vehicles, a tire for racing cars, an aircraft tire, a tire for agricultural machines, a tire for off-the-road driving, a truck tire, a bus tire, or the like. Further, the tire may be a radial tire or a bias tire, and preferably the radial tire.

Hereinafter, Examples of the present invention will be described in detail so that the present invention can be easily practiced by those skilled in the art to which the present disclosure pertains. However, the present disclosure can be implemented in various different forms and is not limited to the Examples described herein.

Preparation Example: Preparation of Rubber Compositions

Rubber compositions for tire tread according to the following Examples and Comparative Example were prepared using the same compositions as represented in the following Table 1. The rubber compositions were prepared according to a general rubber composition preparation method.

TABLE 1

|  | Example 1 | Example 2 | Example 3 | Example 4 | Comparative Example 1 |
|---|---|---|---|---|---|
| NR[1] | 10 | 10 | 10 | 10 | 10 |
| SBR[2] | — | — | — | — | 70 |
| MG-SBR-0.2[3] | 70 | — | — | — | — |
| MG-SBR-0.5[4] | — | 70 | — | — | — |
| MG-SBR-1.0[5] | — | — | 70 | — | — |
| MG-SBR-2.0[6] | — | — | — | 70 | — |
| BR[7] | 20 | 20 | 20 | 20 | 20 |
| Carbon black[8] | 5 | 5 | 5 | 5 | 5 |
| Silica[9] | 90 | 90 | 90 | 90 | 90 |
| Coupling agent | 7.2 | 7.2 | 7.2 | 7.2 | 7.2 |
| Synthetic oil[10] | 20 | 20 | 20 | 20 | — |
| Zinc oxide | 2 | 2 | 2 | 2 | 2 |
| Antiaging agent | 6 | 6 | 6 | 6 | 6 |
| Vulcanizing agent | 0.7 | 0.7 | 0.7 | 0.7 | 0.7 |
| Accelerator | 2.3 | 2.3 | 2.3 | 2.3 | 2.3 |

Unit: Parts by weight
[1] Natural rubber, as rubber obtained from the nature, has chemical name of polyisoprene
[2] SBR is a solution-polymerized styrene butadiene rubber (S-SBR) having a styrene content of 35% and a content of 25% of vinyl contained in butadiene, having a Tg of −35° C., and including 37.5 parts by weight of SRAE oil
[3] MG-SBR-0.2 is a melt grafting styrene butadiene rubber having 0.2 wt % glycidyl methacrylate (GMA) introduced thereinto
[4] MG-SBR-0.5 is a melt grafting styrene butadiene rubber having 0.5 wt % glycidyl methacrylate (GMA) introduced thereinto
[5] MG-SBR-1.0 is a melt grafting styrene butadiene rubber having 1.0 wt % glycidyl methacrylate (GMA) introduced thereinto
[6] MG-SBR-2.0 is a melt grafting styrene butadiene rubber having 2.0 wt % glycidyl methacrylate (GMA) introduced thereinto
[7] BR is butadiene rubber manufactured using a neodymium catalyst
[8] Carbon black is carbon black having a nitrogen adsorption value of 140 $m^2/g$ and a CTAB value of 130 $m^2/g$
[9] Silica is high dispersibility silica having a nitrogen adsorption value of 175 $m^2/g$ and a CTAB value of 160 $m^2/g$
[10] Synthetic oil is synthetic oil having a total PAHs component amount of 3 wt % or less and a kinematic viscosity of 95 (210° F. SUS) and comprising 20 wt % of an aromatic component, 30 wt % of a naphthenic component and 40 wt % of a paraffinic component in a softener Experimental Example 1: Measuring Physical Properties of Prepared Rubber Compositions After measuring physical properties of sheet rubbers manufactured using rubber compositions prepared in the Examples and Comparative Example, measurement results are represented in the following Table 2.

TABLE 2

|  | Example 1 | Example 2 | Example 3 | Example 4 | Comparative Example 1 |
|---|---|---|---|---|---|
| Mooney viscosity | 88 | 94 | 108 | 115 | 85 |

TABLE 2-continued

|  | Example 1 | Example 2 | Example 3 | Example 4 | Comparative Example 1 |
|---|---|---|---|---|---|
| Hardness (Shore A) | 67 | 68 | 70 | 73 | 66 |
| 300% Modulus (kgf/cm$^2$) | 125 | 129 | 135 | 155 | 120 |
| Fracture energy (kgf/cm$^2$) | 290 | 295 | 280 | 265 | 280 |
| Tg (° C.) | −19 | −19 | −19 | −19 | −19 |
| 0° C. tan δ | 0.365 | 0.368 | 0.379 | 0.382 | 0.354 |
| 60° C. tan δ | 0.097 | 0.091 | 0.088 | 0.087 | 0.102 |

Mooney viscosity values (ML1+4(125° C.)) were measured in accordance with ASTM D 1646 at 125° C. by using Mooney viscometer MV2000 VS (Alpha Technologies) with a large rotor and applying preheat time of 1 minute and rotor operating time of 4 minutes.

Hardness was measured in accordance with DIN 53505 by using Shore A durometer.

300% modulus values, tensile strength values during 300% elongation, were measured in accordance with ISO 37.

Fracture energy values, which mean energy values obtained when rubbers are fractured in accordance with ISO 37, were measured by a method of exhibiting strain energy values obtained when specimens were cut in a tensile testing machine as numerical values.

G', G" and tan δ as viscoelasticity values were measured from −60° C. to 70° C. using an ARES measuring device under 0.5% strain and 10 Hz frequency.

Mooney viscosity, as an indicator exhibiting processability of a rubber composite, means that the higher a numerical value of Mooney viscosity is, the higher viscosity of rubber is, and exhibits that the lower a numerical value of Mooney viscosity is, the more excellent processability of unvulcanized rubber is. The higher a numerical value of hardness which exhibits steering stability is, the more excellent steering stability performance of the rubber composition is. 300% modulus exhibits that the higher a numerical value of 300% modulus is, the more excellent tensile properties and strength of the rubber composition are. Fracture energy exhibits that the higher a numerical value of fracture energy is, the more excellent abrasion resistant performance of the rubber composition is. The lower a numerical value of Tg which exhibits braking characteristics on an ice and snow road surface is, the more excellent braking performance of the rubber composition is. The higher a numerical value of 0° C. tan δ which exhibits braking characteristics on a dry or wet road surface is, the more excellent braking performance of the rubber composition is. The lower a numerical value of 60° C. tan δ which exhibits rolling resistance is, the more excellent low fuel consumption properties of the rubber composition are.

Referring to results of the foregoing Table 2, it can be seen that Examples 1 to 4 comprising a melt grafting-functionalized styrene butadiene rubber will have improved tensile properties and strength by increasing 300% modulus, improved braking performance on a dry road surface or a wet road surface by increasing 0° C. tan δ, and improved low fuel consumption properties by decreasing 60° C. tan δ compared to Comparative Example 1 comprising a solution-polymerized styrene butadiene rubber which is not functionalized by melt grafting.

Experimental Example 2: Performance Evaluation During Tire Application

After measuring physical properties of rubber specimens manufactured in the Examples and Comparative Example, measurement results are represented in the following Table 3.

TABLE 3

|  | Example 1 | Example 2 | Example 3 | Example 4 | Comparative Example 1 |
|---|---|---|---|---|---|
| Rolling resistance | 103 | 109 | 111 | 112 | 100 |
| Braking performance on a wet road surface | 106 | 107 | 110 | 111 | 100 |
| Abrasion resistant performance | 115 | 118 | 118 | 119 | 100 |

Referring to results of the foregoing Table 3, it can be confirmed that the rubber compositions of Examples 1 to 4 prepared by applying a melt grafting-functionalized styrene butadiene rubber all exhibit improved effects in rolling resistance, braking performance on the wet road surface and abrasion resistant performance compared to the rubber composition of Comparative Example 1.

Hereinabove, exemplary embodiments of the present disclosure have been described in detail. However, the scope of the present disclosure is not limited thereto, but various changes or modified forms of those skilled in the art using a basic concept of the present disclosure defined in the following claims can also be within the scope of the present disclosure.

What is claimed is:

1. A rubber composition for tire tread, the rubber composition comprising 100 parts by weight of raw rubber and 70 to 120 parts by weight of a reinforcing filler, wherein the raw rubber includes 0 to 50 parts by weight of natural rubber, 20 to 100 parts by weight of a melt grafting-functionalized styrene butadiene rubber, and 0 to 30 parts by weight of butadiene rubber.

2. The rubber composition for tire tread of claim 1, wherein the melt grafting-functionalized styrene butadiene rubber introduces a peroxide and an acrylate-based or methacrylate-based functional group using an emulsion-polymerized or solution-polymerized styrene butadiene rubber.

3. The rubber composition for tire tread of claim 1, wherein the melt grafting-functionalized styrene butadiene rubber includes 20 to 50 wt % of styrene, and has 10 to 40 wt % of vinyl contained in butadiene.

4. The rubber composition for tire tread of claim 1, wherein the melt grafting-functionalized styrene butadiene rubber has a glass transition temperature of −50 to −10° C., and includes 10 to 40 parts by weight of oil with respect to 100 parts by weight of the melt grafting-functionalized styrene butadiene rubber.

5. The rubber composition for tire tread of claim 2, wherein the acrylate-based functional group is selected from the group consisting of 2-carboxyethyl acrylate, methyl acrylate, ethyl acrylate, ethylene glycol methyl ether acrylate, vinyl acrylate, 2-hydroxyethyl acrylate, isooctyl acrylate, octyl acrylate, and combinations thereof, and the methacrylate-based functional group is selected from the group consisting of methyl methacrylate, 2-(diethylamino)ethyl methacrylate, polymethylmethacrylate, poly(ethylene glycol)methacrylate, hydroxypropyl methacrylate, ethylene glycol methyl ether methacrylate, 2-(dimethylamino)ethyl methacrylate, 2-(diethylamino)ethyl methacrylate, glycidyl methacrylate, and combinations thereof.

6. The rubber composition for tire tread of claim 1, wherein the butadiene rubber includes 90 wt % or more of cis-1,4-butadiene and has a glass transition temperature of −100 to −120° C.

7. The rubber composition for tire tread of claim 1, wherein the reinforcing filler includes 5 to 20 parts by weight of carbon black and 65 to 100 parts by weight of silica.

8. The rubber composition for tire tread of claim 7, wherein the silica is high dispersibility silica having a nitrogen adsorption specific surface area of 160 to 180 $m^2/g$ and a CTAB adsorption specific surface rea of 150 to 170 $m^2/g$.

9. A tire manufactured by using the rubber composition for tire tread of any one of claims 1 to 8.

* * * * *